United States Patent [19]

Lowery, Jr. et al.

[11] 4,285,834

[45] Aug. 25, 1981

[54] DUAL, INDEPENDENTLY SUPPORTED CATALYST MIXTURES

[75] Inventors: Kirby Lowery, Jr.; Fred L. Vance, Jr., both of Lake Jackson, Tex.

[73] Assignee: The Dow Chemical Company, Midland, Mich.

[21] Appl. No.: 108,896

[22] Filed: Dec. 31, 1979

[51] Int. Cl.³ .............................. C08F 4/02; C08F 4/62; C08F 4/64

[52] U.S. Cl. ........................... 252/429 C; 526/125; 526/129; 526/114; 526/156; 526/157; 526/158

[58] Field of Search ...................................... 252/429 C

[56] References Cited

U.S. PATENT DOCUMENTS

| | | | |
|---|---|---|---|
| 2,825,721 | 3/1958 | Hogan et al. ........................ | 526/106 |
| 2,846,425 | 8/1958 | Hogan et al. ..................... | 252/465 X |
| 3,351,623 | 11/1967 | Walker et al. .................... | 252/428 X |
| 3,752,795 | 8/1973 | Boone ........................... | 252/431 R X |
| 3,798,202 | 3/1974 | Nasser .............................. | 252/469 X |
| 4,041,224 | 8/1977 | Hoff et al. ............................ | 252/430 |
| 4,097,659 | 6/1978 | Creemers et al. ............ | 252/429 C X |
| 4,104,198 | 8/1978 | May et al. ..................... | 252/429 C X |
| 4,120,820 | 10/1978 | Birkelbach ...................... | 252/429 B |
| 4,150,208 | 4/1979 | Hwang ................................. | 526/96 |
| 4,204,050 | 5/1980 | Bressler et al. .................. | 252/429 C |

FOREIGN PATENT DOCUMENTS 790196 2/1958 United Kingdom .
1500873 2/1978 United Kingdom .

Primary Examiner—Patrick Garvin
Attorney, Agent, or Firm—J. G. Carter

[57] ABSTRACT

A catalyst mixture containing at least two independently supported catalysts, at least one of which is an inorganic halide supported titanium and/or vanadium Ziegler type catalyst and at least one other is an inorganic oxide supported, chromium catalyst.

These catalyst mixtures are suitable for polymerizing one or more α-olefins.

9 Claims, No Drawings

DUAL, INDEPENDENTLY SUPPORTED CATALYST MIXTURES

BACKGROUND OF THE INVENTION

Transition metal catalysts have been employed to prepare polymers and copolymers of α-olefins. For the most part, the polymer properties have been controlled or varied by changes in the process conditions as disclosed by Hogan et al in U.S. Pat. No. 2,825,721; by Walker et al in U.S. Pat. No. 3,351,623; "The Polymerization of Olefins by Ziegler Catalysts," Bergy, M. N., et al, *Advances in Catalysis,* Vol. 19, and "Supported Chromium Catalysts for Ethylene Polymerization," Annual Symposium, *Joint Meeting of the American Chemical Society and Chemical Society of Japan,* April 1–6, 1979.

It has now been discovered that the polymer properties can be varied by employing two different catalysts during polymerization of the α-olefin. Such polymerization process provides for one or more of the following:

(1) alteration of the physical properties of the polymer without changing process conditions;
(2) change physical properties of the polymer without the use of hydrogen,
(3) change polymer composition of copolymers by changing catalyst ratios rather than comonomer ratios and/or
(4) increased catalyst efficiency.

SUMMARY OF THE INVENTION

The present invention is directed to a process for polymerizing one or more α-olefins which comprises conducting the polymerization in the presence of independently supported transition metal catalysts, one of which is a catalytically active inorganic halide supported catalyst containing titanium, vanadium or a mixture thereof and another which is an inorganic oxide supported catalytically active catalyst containing chromium.

DESCRIPTION OF THE PREFERRED EMBODIMENTS

A. Ziegler Catalyst

Any inorganic halide supported Ziegler catalyst containing titanium and/or vanadium can be employed as one of the independently supported catalysts so long as it is by itself catalytically active in polymerizing α-olefins.

Such suitable active supported titanium and/or vanadium containing catalysts are described in U.S. Pat. Nos. 4,067,822; 4,091,082; 4,097,659 4,104,198 and 4,120,820 and British Pat. No. 1,500,973 which are incorporated herein by reference.

Suitable supports for the Ziegler type catalysts include the inorganic halides such as, for example, $TiCl_3$, $MgCl_2$, $AlCl_3$ mixtures thereof and the like.

Particularly suitable are those magnesium dihalide supported titanium catalysts prepared from an organomagnesium compound, a halide source, a titanium tetraalkoxide and a reducing agent, preferably a reducing agent which contains aluminum and wherein the atomic ratios of the elements are as follows:

Mg:Ti is from about 0.1:1 to about 200:1 preferably from about 1:1 to about 100:1, and most preferably from about 10:1 to about 50:1.

Al:Ti is from about 0.5:1 to about 200:1 preferably from about 1:1 to about 100:1, and most preferably from about 5:1 to about 50:1.

xsX:Al is from about 0:1 to about 10:1 preferably from about 0.01:1 to about 1:1, and most preferably from about 0.1:1 to about 0.4:1.

The "xsX" is defined at that quantity of halide in excess of that theoretically required to convert all of the organomagnesium compound to magnesium dihalide.

B. Chromium Catalyst

Any supported chromium-containing catalyst which is sufficiently active to polymerize an α-olefin by itself can be employed in the present invention.

Suitable such supported chromium catalysts include those disclosed in U.S. Pat. Nos. 4,150,208 and 2,846,425 and British Pat. No. 790,196 which are incorporated herein by reference.

Suitable supports for the chromium catalysts include the inorganic oxides such as for example, silica, alumina, silica-alumina, thoria, zirconia and the like.

The chromium catalyst and support are employed in an atomic ratio of Ms:Cr, where Ms is the metallic element in the support as follows:

Ms:Cr is from 10:1 to about 1000:1, preferably from about 20:1 to about 500:1 and most preferably from about 50:1 to about 200:1.

Also suitable are catalysts which contain chromium and one or more transition metals from Groups IVB and/or VB of the Periodic Table. These type catalysts may be used according to type of support. Those catalysts which employ inorganic oxide supports are suitable for use as modified chromium catalysts whereas those which employ halide type supports are suitable for use as modified Ziegler catalysts. Examples of the former are disclosed in U.S. Pat. Nos. 4,041,224; 3,622,521; and 3,798,202. Examples of the latter are disclosed in U.S. Pat. Nos. 3,847,957 and 3,752,795 and U.S. patent application Ser. No. 959,287, Bressler, et al, filed November 9, 1978 now U.S. Pat. No. 4,204,050.

The range of catalyst ratios employed is limited only by the ability of one catalyst to produce a significant change in the properties of the polymer that would be produced by the second catalyst. Because types of catalysts vary in productivity at any given set of process conditions, the effect of one catalyst on the product resulting from the use of two catalysts is best described in terms of fractional percent yield. Fractional percent yield is defined as follows for catalysts arbitrarily designated as type n and and type m:

catalyst $n$ productivity $= P_n = \dfrac{\text{gms. polymer produced by catalyst } n}{\text{gms. catalyst } n \times \text{unit time}}$ catalyst $n$ yield $= Y_n =$ gms. catalyst $n \times$ unit time $\times P_n$ total yield $= T = Y_n + Y_m$ catalyst $n$ fractional % yield $= X_n = Y_n/T$ $X_m = 1 - X_n$ Throughout this specification, unless noted otherwise, the subdesignation 'n' pertains to the inorganic halide supported catalyst and the subdesignation 'm' pertains to the inorganic oxide supported catalyst.

It should be noted that this treatment assumes that direct linear combinations of catalysts will give results that are direct linear combinations of the results expected from each catalyst independently. This may not be entirely accurate due to catalyst synergestic interactions or concentration effects, but it serves the purpose of defining the limits of useful catalyst ratios.

The fractional percent yields, $X_n$ and $X_m$, should be between 0.001 and 0.999, preferably between 0.01 and 0.99 and most preferably 0.1 and 0.9. Any value less than 0.001 or higher than 0.999 will tend to give results that cannot be distinguished from those of a single catalyst system. Within the range given, the value of $X_n$ or $X_m$ will be determined according to the polymer physical properties desired.

In a catalyst system using two well defined catalysts, it may be desirable to emperically relate physical properties to a ratio of catalyst components (e.g. Cr/Ti). Such a relationship is valid only if the individual catalyst compositions and process conditions are held invariant.

C. Monomers

Olefins which are suitably homopolymerized or copolymerized in the practice of this invention are generally the aliphatic α-moloolefins and α-diolefins having from 2 to about 18 carbon atoms. Illustratively, such α-olefins can include ethylene, propylene, butene-1, butadiene, pentene-1, 3-methylbutene-1, 4-methylpentene-1, hexene-1, octene-1, dodecene-1, octadecene-1, 1,7-octadiene, mixtures thereof and the like. It is understood that α-olefins may be copolymerized with other α-olefins and/or with minor amounts, i.e. up to about 25 weight percent based on the polymer, of other polymerizable ethylenically unsaturated monomers such as styrene, α-methylstyrene and similar ethylenically unsaturated monomers which do not destroy conventional Ziegler catalysts. Most benefits are realized in the polymerization of aliphatic 1-monoolefins, particularly ethylene and mixtures of ethylene with up to about 50, especially from 0.1 to about 40 percent by weight, based on total monomer, of propylene, butene-1, hexene-1, octene-1, 4-methylpentene-1, 1,7-octadiene, butadiene or similar α-olefins or diolefins.

D. Polymerization Conditions

In the polymerization process of the present invention the independently supported catalysts are mixed together just prior to entry into the reaction zone or vessel or preferably they are fed or added separately to the polymerization zone or vessel containing α-olefin monomer or vice versa. The polymerization zone is maintained at temperatures in the range from about 0° to about 300° C., preferably at solution polymerization temperatures, e.g. from about 120° to about 270° C., for a residence time of about a few seconds to about 72 hours, preferably 15 seconds to 2 hours.

It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium.

Generally, in the polymerization process, a carrier which may be an inert organic diluent or solvent or excess monomer is employed.

Suitable inert diluents which can be employed in the polymerization and as carriers for the catalysts include, for example, liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about 200° C.

The polymerization pressures preferably employed are relatively low, e.g., from about 50 to about 30,000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 99 weight percent, most advantageously from about 10 to about 20 weight percent. To achieve this, when an excess of ethylene is fed into the system, a portion of the ethylene can be vented.

Although in the present invention it is not necessary to employ hydrogen in order to control the molecular weight of the polymer, the polymerization nevertheless can be employed in the presence of hydrogen as an additional control if so desired.

In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue.

The following examples are given to illustrate the invention, and should not be construed as limiting its scope. All percentates are by weight and all parts are by molar or atomic ratio unless otherwise indicated.

In the following examples, the melt index values $I_2$ and $I_{10}$ were determined by ASTM D 1238-70 and the density values were determined by ASTM D 1248-74.

EXAMPLE 1—Preparation of an Inorganic Oxide Supported Chromium Catalyst

A solution of 0.41 g of Cr VI oxide in 22 g of deionized water was mixed thoroughly with 20 g of Davidson 952 silica. The mixture was placed in a Vicor quartz tube and heated to 200° C. for $2\frac{1}{2}$ hours fluidized by air dried by passing through a column of molecular sieves. After drying, the temperature was raised to 750° C. for $21\frac{1}{2}$ hours. The activated catalyst was stored in a nitrogen filled dry box. The atomic ratio of Si:Cr was 81.2:1.

EXAMPLE 2—Preparation of an Inorganic Oxide Supported Chromium Catalyst

A 0.2 g quantity of $SrCO_3$ was added to 15 ml of deionized water and dissolved by adding 10 drops of concentrated nitric acid. To this solution was added 0.3 g of Cr VI oxide. The solution was then mixed with 15 g of Davidson 952 silica. The mixture was then dried at 100° C. for 5 hours, giving a constant weight of about 15 g. The dried catalyst was heat activated in a VICOR tube at 535° C. for 10 hours while fluidizing with air dried in a molecular sieve bed. The catalyst was subsequently cooled and stored under nitrogen. The atomic ratio of Si:Cr was 83:1.

EXAMPLE 3—Preparation of An Inorganic Halide Supported Titanium Catalyst

Preparation of a Ziegler-Type Catalyst. In a nitrogen filled dry box, a 1.5 ml volume of 0.5 M solution of ethylaluminum dichloride in Isopar ® E (an isoparaffinic hydrocarbon having a boiling range of 116° C. to 134° C. commercially available from the Exxon Corp.) was added to a 4 oz. catalyst bottle containing 96 ml of Isopar ® E. A 1.5 ml volume of a 0.01 M solution of tetraisopropyl titanate in Isopar ® E was added to a catalyst bottle followed by the addition of 1.5 ml of 0.4 M solution of di-n-hexyl magnesium in Isopar ® E with stirring. The catalyst bottle was then sealed with a rubber septum and removed from the dry box. The atomic ratio of Mg:Ti was 40:1, Al:Ti was 50:1 and xsCl:Al was 0.2:1.

EXAMPLE 4

A. Present Invention

To a stirred 5-liter batch reactor at 150° C. containing 2 liters (25 psig solvent vapor pressure) of Isopar ® E purified by passing through molecular sieves, was added 10 psig chromatographic grade hydrogen and 340 psig of ethylene which was purified by passing through molecular sieves. An Isopar ® E slurry containing 0.1 g of the catalyst prepared in example 1 above was syringed into a 75 ml pressure bomb under a nitrogen purge. The bomb was then pressured to 450 psig with nitrogen and the catalyst was vented into the reactor. A 1 ml volume of 15% aluminum triethyl was vented into the reactor in the same manner followed by the injection of 15 ml of the catalyst slurry prepared in example 3 containing approximately 9 mg of catalyst. Ethylene was polymerized for 1 hour. The polymer was removed from the reactor and dried in a vacuum oven at 80° C. The 220 g of recovered polymer had a melt index ($I_2$) of 16.82, a melt index ($I_{10}$) of 143.5, an $I_{10}/I_2$ of 8.53, a density of 0.9617, and a catalyst efficiency of $220 \times 10^3$ g polymer/g Cr, or $2.0 \times 10^6$ g polymer/g Ti or $2 \times 10^3$ g polymer/g catalyst. The fractional percent yield of the inorganic halide supported catalyst, Xn, was 0.73 and the fractional percent yield of the inorganic oxide supported catalyst, Xm, was 0.27 calculated as follows:

Pn = 70 g/6 mg × 30 minutes = 389
Pm = 156 g/0.2 g × 60 minutes = 13
Yn = 9 mg × 60 minutes × 389 = 210
Ym = 0.1 g × 60 minutes × 13 = 78
T = Yn + Ym = 288
Xn = Yn/T = 210/288 = 0.73
Xm = 1 − Xn = 0.27

B. Comparative Experiment Polymerization with an Inorganic Halide Supported Titanium Catalyst only In a polymerization similar to example 4A, 10 psig hydrogen and 340 psig ethylene was added to the reactor at a temperature of 150° C. (25 psig solvent vapor). A 10 ml volume of the catalyst slurry of example 3, containing approximately 6 mg of catalyst was injected into the reactor and allowed to polymerize ethylene for 30 minutes. The 70 g of polymer recovered had a melt index ($I_2$) of 5.74, a melt index ($I_{10}$) of 46.8, an $I_{10}/I_2$ of 8.15, and a density of 0.9633. The efficiency was $1.0 \times 10^6$ g polymer/g Ti or $11.7 \times 10^3$ g polymer/g catalyst.

C. Comparative Experiment Polymerization with an Inorganic Oxide Supported Chromium Catalyst only In a polymerization similar to example 4A, 10 psig hydrogen and 340 psig ethylene were added to the reactor at a temperature of 150° C. (25 psig solvent vapor). An Isopar ® E slurry containing 0.2 g of catalyst prepared in example 1 was injected into the reactor and allowed to polymerize ethylene for 1 hour. The 156 g of polymer produced had a melt index ($I_2$) of 54.36, a melt index ($I_{10}$) of 407.2, an $I_{10}/I_{2L}$ of 7.49, and a density of 0.9706. The efficiency was $78 \times 10^3$ g polymer/g Cr or $0.78 \times 10^3$ g polymer/g catalyst.

EXAMPLE 5

A. Present Invention

In a polymerization similar to example 4A, 345 psig ethylene was added to the reactor at a temperature of 160° C. (30 psig solvent vapor). An Isopar ® E slurry containing 0.05 g of catalyst prepared in example 1 was injected into the reactor followed by the injection of 10 ml of a catalyst slurry as prepared in example 3, containing about 6 mg of catalyst. Ethylene was polymerized for 31 minutes. The 97 g of polymer produced had a melt index ($I_2$) of 0.95, a melt index ($I_{10}$) of 13.5, an $I_{10}/I_2$ of 14.22, and a density of 0.9642. The efficiency was $190 \times 10^3$ g polymer/g Cr or $1.35 \times 10^6$ g polymer/g Ti or $1.7 \times 10^3$ g polymer/g catalyst. The fractional percent yield of the inorganic halide supported catalyst, Xn, was 0.75 and the fractional percent yield of the inorganic oxide supported catalyst, Xm, was 0.25 calculated as follows:

Pn = 61 g/6 mg × 30 minutes = 339
Pm = 121 g/0.2 g × 45 minutes = 13.4
Yn = 6 mg × 31 minutes × 339 − 63
Ym = 0.05 g × 31 min × 13.4 = 20.8
T = Yn + Ym = 83.8
Xn = Yn/T = 63/83.8 = 0.75
Xm = 1 − Xn = 1 − 0.75 = 0.25

B. Comparative Experiment Polymerization with Inorganic Oxide Supported Chromium Catalyst only In a polymerization similar to example 5A, using only a slurry containing 0.2 g of catalyst from example 1, ethylene was polymerized for 45 minutes. The 121 g of polymer produced had a melt index ($I_2$) of 99.95, a melt index ($I_{10}$) of 809.6, an $I_{10}/I_2$ of 8.1, and a density of 0.9717. The efficiency was $81 \times 10^3$ g polymer/g Cr or $0.6 \times 10^3$ g polymer/g catalyst.

C. Comparative Experiment Polymerization with Inorganic Halide Supported Titanium Catalyst only In a polymerization simlar to example 5A, using only 10 ml of the catalyst slurry as prepared in example 3, (containing about 6 mg of catalyst) ethylene was polymerized for 30 minutes. The 61 g of polymer produced had a melt index ($I_2$) of 0.49, a melt index ($I_{10}$) of 3.66, an $I_{10}/I_2$ of 7.47, and a density of 0.9634. The efficiency was $0.85 \times 10^6$ g polymer/g Ti or $10 \times 10^3$ g polymer/g catalyst.

EXAMPLE 6

A. Present Invention

In a polymerization similar to example 4A, 357 psig ethylene was added to the reactor at a temperature of 145° C. (18 psig solvent vapor). A 100 ml volume of 1-octene purged with nitrogen and stored over molecular sieves was injected into the reactor. A 10 ml of catalyst slurry as prepared in example 3, containing about 6 mg of catalyst was injected into the reactor followed by an Isopar® E slurry of 0.4 g of catalyst prepared in example 2. Ethylene and 1-octene were copolymerized for 28 minutes. The 131 g of copolymer produced had a melt index ($I_2$) of 4.13, a melt index ($I_{10}$) of 47.2, an $I_{10}/I_2$ of 11.44, and a density of 0.9324. The efficiency was $32.8 \times 10^3$ g copolymer/g Cr or $1.8 \times 10^6$ g copolymer/g Ti or $0.32 \times 10^3$ g copolymer/g catalyst. The fractional percent yield of the inorganic halide supported catalyst, Xn, was 0.62 and the fractional percent yield of the inorganic oxide supported catalyst, Xm, was 0.38 calculated as follows:

Pn = 72 g/6 mg × 30 minutes = 400
Pm = 88 g/0.4 g × 60 minutes = 3.67
Yn = 6 mg × 28 minutes × 400 = 67.2
Ym = 0.4 g × 28 min × 3.67 = 41.1
Xn = Yn/Yn + Ym = 67.2/108.3 = 0.62
Xm = 1 − Xn = 1 − 0.62 = 0.38

B. Comparative Experiment Polymerization with Inorganic Oxide Supported Chromium Catalyst only In a polymerization similar to example 6A, using 200 ml of 1-octene and using only 0.4 g of catalyst prepared in example 2, ethylene was copolymerized with 1-octene for 1 hour. The 88 g of copolymer produced had a melt index ($I_2$) of 0.21, a melt index ($I_{10}$) of 4.69, an $I_{10}/I_2$ of 22.33, and a density of 0.9500. The efficiency was $22 \times 10^3$ g copolymer/g Cr or $0.22 \times 10^3$ g copolymer/g catalyst.

C. Comparative Experiment Polymerization with Inorganic Halide Supported Titanium Catalyst only In a polymerization similar to example 6A, using only 10 ml of the catalyst slurry as prepared in example 3 (containing 6 mg of catalyst), 1-octene was copolymerized for 36 minutes. The 72 g of copolymer produced gave an efficiency of $1 \times 10^6$ g of copolymer/g Ti or $12.6 \times 10^3$ g copolymer/g catalyst. The copolymer had a melt index ($I_2$) of 0.249, a melt index ($I_{10}$) of 3.35, an $I_{10}/I_2$ of 13.45, and a density of 0.9386.

EXAMPLE 7

Seven catalysts were prepared and twenty-two polymerizations were conducted using these catalysts separately and in combinations. These polymerizations were all conducted under the same process conditions and where possible, the total transition metal content of the catalyst or catalysts was held constant. These polymerizations and the physical property data obtained from the polymer produced are included for the purpose of demonstrating:

1. the invention compared with single catalyst systems
2. the effect of Cr/Ti ratios
3. the effect of catalyst fractional percent yield and
4. the invention compared with multiple transition metal catalysts.

The catalysts used were prepared as follows:

Catalyst I: 1% Cr Catalyst Supported on an Inorganic Oxide

A solution of 0.15 gms of $CrO_3$ in 10 gms of water was thoroughly mixed with 8 gms of Davidson grade 952 silica. The mixture was heated for one hour at 170° C. in a VICOR tube while being fluidized with nitrogen. The temperature was then increased to 700° C. and the catalyst was fluidized for 5 hours with dry air. The catalyst was cooled under nitrogen purge and stored under nitrogen. This catalyst contained 88.8 Si/Cr.

Catalyst II: 3% Cr Catalyst Supported on an Inorganic Oxide

A catalyst was prepared as for catalyst I except that 0.45 gms of $CrO_3$ was used to give 29.6 Si/Cr.

Catalyst III: Ziegler Catalyst Supported on an Inorganic Halide

In a nitrogen filled dry box, 0.6 ml of 0.5 M ethyl aluminum dichloride was added to 87.4 ml of Isopar® E in a 4 oz catalyst bottle. A 1.5 ml volume of 0.4 M di-n-hexyl magnesium, 6.0 ml of 0.1 M titanium tetrachloride, and 4.5 ml of 0.1 M triethyl aluminum were also added to the solution in that order to form the active catalyst. The catalyst was then sealed with a rubber septum and removed from the dry box. The atomic ratio of Mg:Ti was 1:1, Al:Ti was 1.25:1, and xsCl:Al was 2.4:1.

Catalyst IV: Titanium Modified Cr Catalyst Supported on an Inorganic Oxide

A catalyst was prepared as for catalyst II except that 2.1 ml of tetraisopropyl titanate was added to the $N_2$ fluidized catalyst by syringe prior to heating with dry air at 700° C. for 5 hours.

Catalyst V: Titanium Modified Cr Catalyst Supported on an Inorganic Oxide

A catalyst was prepared as for catalyst IV except that after addition of the titanate, the catalyst was treated 4.75 hours at 700° C. while being fluidized by a 93% $N_2$—7% CO (by volume) mixture. The catalyst was cooled to 500° C. and purged with $N_2$ for 30 minutes and then fluidized with dry air at 500° C. for 15 minutes. Finally the catalyst was cooled while purging with $N_2$ and stored in a $N_2$ filled dry box.

Catalyst VI: Chromium Modified Ti Catalyst Supported on an Inorganic Halide

In a nitrogen filled dry box, 1.5 ml of 0.5 M ethyl aluminum dichloride was added to 96 ml of Isopar ® E in a 4 oz. catalyst bottle. To this solution was added 1.5 ml of 0.4 M di-n-hexyl magnesium and 1.15 ml of an Isopar ® E solution of the reaction product of dichlorodiisopropyl titanate and $CrO_3$ (0.013 M Ti). The catalyst was then sealed with a rubber septum and removed from the dry box. The atomic ratio of Mg:Ti was 40:1, Al:Ti was 50:1, xsCl:Al was 0.2:1, and Cr/Ti was 0.41.

Catalyst VII: Chromium Modified Ti Catalyst Supported on an Inorganic Halide A catalyst was prepared as for catalyst VI except that 1.88 ml of an Isopar ® E solution of the reaction product of tetraisopropyl titanate and $CrO_3$ (0.0081 M Ti) was used as the titanium source. The atomic ratio for Mg:Ti was 40:1, Al:Ti was 50:1, xsCl:Al was 0.2:1 and Cr/Ti was 0.16.

Polymerizations

Polymerizations for the catalyst comparisons were made in a 5 liter stirred batch reactor containing 2 liters of Isopar ® E purified by passing through molecular sieves. Each polymerization was run under the same process conditions, the only variables being the amounts and types of catalysts. The temperature was 160° C. (15 psig vapor pressure) and the ethylene pressure was 325 psi. No hydrogen was used.

The catalysts were weighed out in a nitrogen filled dry box and slurried in 50 ml. of Isopar ® E except for catalysts III, VI, and VII which were already slurries. In each polymerization, 5 ml of 0.1 M triethyl aluminum was injected into the reactor prior to adding the catalysts to react with any impurities that might have been present.

Results of the polymerizations are listed in the following Table.

TABLE

| POLYMERI-ZATION NUMBER | CATALYSTS mg/type | Cr (mg) | Ti (mg) | Cr/Ti | Total Transition Metals (mg) | PRODUCTIVITY YIELDS AND EFFICIENCIES |||||||||| POLYMER PHYSICAL PROPERTIES ||||
|---|---|---|---|---|---|---|---|---|---|---|---|---|---|---|---|---|---|---|
| | | | | | | $P_n^1$ ($\times 10^{-3}$)[11] | $P_m^2$ ($\times 10^{-3}$) | $X_n^3$ | $Y_n^4$ (g) | $Y_m^5$ (g) | $T^8$ (g) | $T/Cr^7$ ($\times 10^{-3}$) | $T/Ti^8$ ($\times 10^{-3}$) | $T/catalyst^9$ ($\times 10^{-3}$) | Melt Index |||
| | | | | | | | | | | | | | | | $(I_2)$ | $(I_{10})$ | $I_{10}/I_2$ | Density |
| 1[12] | 360/I | 3.6 | — | — | 3.6 | | 0.519 | | | 187 | | 51.9 | — | 0.519 | 45.24 | 550.2 | 12.2 | .9517 |
| 2[13] | 240/II | 7.2 | — | — | 7.2 | | 0.542 | | | 130 | | 18.1 | — | 0.542 | 3.32 | 86.12 | 25.9 | .9491 |
| 3[14] | 21/III | — | 3.6 | — | 3.6 | 5.76 | | | 121 | | | — | 33.6 | 5.76 | .03 | 0.57 | 19.0 | .9553 |
| 4[15] | 200/IV | 6 | 8.4 | 0.71 | 14.4 | | 0.20 | | | 40 | | 6.67 | 4.76 | 0.20 | .08 | 3.11 | 38.9 | .9571 |
| 5[16] | 200/V | 6 | 8.4 | 0.71 | 14.4 | | 0.19 | | | 38 | | 6.33 | 4.52 | 0.19 | .02 | 0.94 | 47.0 | .9600 |
| 6[17] | 12/VI | .058 | .14 | 0.41 | 0.2 | 12.7 | | | 152 | | | 2620. | 1085. | 12.7 | .34 | 5.50 | 16.2 | .9598 |
| 7[18] | 12/VII | .023 | .14 | 0.16 | 0.16 | 9.17 | | | 110 | | | 4782. | 785. | 9.17 | .64 | 8.19 | 12.8 | .9602 |
| 8[19] | 300/I + 24.5/III | 3 | 4.2 | 0.71 | 7.2 | | | 0.48 | | | 269 | 89.7 | 64.0 | 0.83 | .19 | 3.70 | 19.5 | .9359 |
| 9[20] | 420/I + 17.2/III | 4.2 | 2.95 | 1.4 | 7.2 | | | 0.31 | | | 232 | 55.2 | 78.6 | 0.53 | .23 | 5.17 | 22.5 | .9465 |
| 10[21] | 100/I + 36.4/III | 1 | 6.25 | 0.16 | 7.2 | | | 0.80 | | | 142 | 142. | 22.7 | 1.04 | .07 | 1.17 | 16.7 | .9511 |
| 11[22] | 210/I + 30/III | 2.1 | 5.1 | 0.41 | 7.2 | | | 0.61 | | | 179 | 85.2 | 35.1 | 0.75 | .12 | 15.8 | 15.8 | .9477 |
| 12[23] | 600/I + 49/III | 6 | 8.4 | 0.71 | 14.4 | | | 0.48 | | | 302 | 50.3 | 36.0 | 0.46 | .56 | 8.37 | 15.0 | .9390 |
| 13[14] | 320/II + 27.4/III | 9.6 | 4.7 | 2.0 | 14.3 | | | 0.48 | | | 231 | 24.1 | 8.43 | 0.67 | .23 | 3.47 | 15.1 | .9470 |
| 14[25] | 160/II + 14/III | 4.8 | 2.4 | 2.0 | 7.2 | | | 0.48 | | | 137 | 28.5 | 57.1 | 0.79 | .07 | 1.11 | 15.9 | .9498 |
| 15[26] | 80/II + 28/III | 2.4 | 4.8 | 0.54 | 7.2 | | | 0.79 | | | 140 | 58.3 | 29.2 | 1.30 | .07 | 0.97 | 13.9 | .9504 |
| 16[27] | 300/I + 24.5/III | 9 | 4.2 | 2.14 | 13.2 | | | 0.46 | | | 175 | 19.4 | 41.7 | 0.54 | .10 | 1.89 | 18.9 | .9523 |
| 17[28] | 160/II + 56/III | 4.8 | 5.6 | 0.54 | 14.4 | | | 0.79 | | | 230 | 47.9 | 41.1 | 1.06 | .13 | 2.06 | 15.8 | .9499 |
| 18[29] | 70/II + 70/IV | 4.2 | 2.9 | 1.44 | 7.1 | | | N.A.[10] | | | 44 | 10.5 | 15.2 | 0.31 | .42 | 7.62 | 18.1 | .9527 |
| 19[30] | 240/II + 6/VI | 7.2 | .072 | 100. | 7.2 | | | 0.37 | | | 63 | 8.75 | 875. | 0.26 | 3.97 | 70.66 | 17.8 | .9526 |
| 20[31] | 240/II + 6/VII | 7.2 | .072 | 100. | 7.2 | | | 0.30 | | | 76 | 10.5 | 1056. | 0.31 | 3.00 | 48.46 | 16.1 | .9532 |
| 21[32] | 170/III + 13.7/IV | 5.1 | 9.4 | 0.54 | 14.5 | | | 0.997 | | | 125 | 24.5 | 13.3 | 0.68 | .02 | 0.47 | 23.5 | .9525 |

TABLE-continued

| POLYMERI-ZATION NUMBER | CATALYSTS | | | | | PRODUCTIVITY YIELDS AND EFFICIENCIES | | | | | | | | POLYMER PHYSICAL PROPERTIES | | | |
|---|---|---|---|---|---|---|---|---|---|---|---|---|---|---|---|---|---|
| | mg/type | Cr (mg) | Ti (mg) | Cr/Ti | Total Transition Metals (mg) | $Pn^1$ ($\times 10^{-3}$)[11] | $Pm^2$ ($\times 10^{-3}$) | $Xn^3$ | $Yn^4$ (g) | $Ym^5$ (g) | $T^8$ (g) | $T/Cr^7$ ($\times 10^{-3}$) | $T/Ti^8$ ($\times 10^{-3}$) | T/catalyst$^9$ ($\times 10^{-3}$) | Melt Index | | | Density |
| | | | | | | | | | | | | | | | ($I_2$) | ($I_{10}$) | $I_{10}/I_2$ | |
| 22[33] | 170/III + 13.7/V | 5.1 | 9.4 | 0.54 | 14.5 | | | 0.997 | | | 102 | 20.0 | 10.9 | 0.56 | .02 | 0.26 | 13.0 | .9526 |

TABLE FOOTNOTES
[1]Pn is gms polymer produced by catalyst 'n'/gms catalyst 'n' — unit time
[2]Pm is gms polymer produced by catalyst 'm'/gms catalyst 'm' — unit time
[3]Xn is Yn/(Yn + Ym)
[4]Yn is gms catalyst 'n' × unit time × Pn
[5]Ym is gms catalyst 'm' × unit time × Pm
[6]T is Yn + Ym
[7]T/Cr is gms polymer/gms Cr = efficiency based on Cr
[8]T/Ti is gms polymer/gms Ti = efficiency based on Ti
[9]T/catalyst is gms polymer/gms catalyst = efficiency based on catalyst
[10]N.A. = non applicable
[11]($\times 10^{-3}$) = value indicated has been multiplied by $10^{-3}$. Actual value for polymerization No. 1, Pm is 519.
[12]Phillips B.P. 790,196; U.S. Pat. No. 3,622,521
[13]Phillips B.P. 790,196; U.S. Pat. No. 3,622,521
[14]Stamicarbon U.S. Pat. No. 4,097,659
[15]Phillips U.S. Pat. No. 3,622,521
[16]Chemplex U.S. Pat. No. 4,041,224
[17]Standard Oil U.S. Pat. No. 3,752,795
[18]Bressler, et al, U.S. Application 959,287, filed November 9, 1978 now Pat. No. 4,204,058
[19]Present Invention
[20]Present Invention
[21]Present Invention
[22]Present Invention
[23]Present Invention
[24]Present Invention
[25]Present Invention
[26]Present Invention
[27]Present Invention
[28]Present Invention
[29]Phillips U.S. Pat. No. 3,798,202
[30]Present Invention
[31]Present Invention
[32]Present Invention
[33]Present Invention A comparison of polymerizations 1, 2 and 3 with 8-17 demonstrates the difference between single catalysts and the dual catalyst system. Each of these polymerizations has different productivities, yields, efficiencies and polymer properties even though they were run at the same process conditions and even though many were run at the same levels of transition metals. (The large difference in productivities of the seven single catalysts made it impossible to use the same T.M. level on each polymerization).

A comparison of polymerizations 8-11 indicate the control over physical properties that is available with the dual catalyst system of the present invention.

| POLYMERIZATION NO. | Cr/Ti | M.I.($I_2$) |
|---|---|---|
| 9 | 1.4 | 0.23 |
| 8 | 0.71 | 0.19 |
| 11 | 0.41 | 0.12 |
| 10 | 0.16 | 0.07 |

As can be seen, the Cr/Ti ratio is a good indication of the effect of the dual catalyst system of the present invention when changes in the Cr/Ti are due to changes in catalyst ratios. This effect is dependent on the process conditions only in limiting the range of physical properties possible as defined by the difference in properties of the two independent catalysts.

A comparison of polymerizations 8-11 with polymerizations 1 and 3 demonstrates the use of catalyst fractional percent yield.

| POLYMERIZATION NO. | Xn | MI($I_2$) | $I_{10}/I_2$ | CATALYST |
|---|---|---|---|---|
| 1 | 0.0 | 45.24 | 12.0 | I(=m) |
| 9 | 0.31 | 0.23 | 22.5 | I + III |
| 8 | 0.48 | 0.19 | 19.5 | I + III |
| 11 | 0.61 | 0.12 | 15.8 | I + III |
| 10 | 0.80 | 0.07 | 16.7 | I + III |
| 3 | 1.0 | 0.03 | 19.0 | III(=n) |

As can be seen, when the Xn approaches unity, the melt index for the dual catalyst system approaches that of catalyst 'n' alone. As Xn approaches zero, the dual catalyst system melt index approaches that for catalyst 'm'.

The molecular weight distribution as represented by the $I_{10}/I_2$ value is a more complex, less linear function than melt index. Broader or more narrow molecular weight distribution can be obtained in the dual catalyst system that can be obtained with either of the two catalysts alone.

A comparison of polymerizations 4 and 12 reflects the difference between the Phillips' titanium modified chromium catalyst (U.S. Pat. No. 3,622,521) and the dual catalyst system at the same Cr/Ti ratio and total transition metal content. All of the physical properties differ and the dual catalyst system of the present invention offers better efficiencies.

The difference between the dual catalyst system and the Chemplex (U.S. Pat. No. 4,041,224) titanium modified chromium catalyst and the present invention is demonstrated by polymerizations 5 and 12. All physical properties are different and efficiencies are greater for the dual catalyst system of the present invention (12).

Because of differences in productivity, it was not possible to have equal transition metal contents when comparing the dual catalyst system (11) and the Standard Oil (U.S. Pat. No. 3,752,795) chromium modified titanium catalyst (6). At the same Cr/Ti ratio however, it is clear that the dual catalyst system of the present invention and the Standard Oil catalysts do not get similar physical polymer properties.

Although the transition metal contents in polymerizations 7 and 10 are not the same, it is obvious that the single magnesium chloride supported chromium modified titanium catalyst (7) and the dual catalyst system of the present invention (10) give different physical polymer properties for the same Cr/Ti ratio.

A comparison of polymerizations 9 and 18 indicate differences in physical properties and improved efficiencies for the dual catalyst system of the present invention (9) compared to the Phillips' (U.S. Pat. No. 3,798,202) dual catalyst system (18).

The Standard Oil chromium modified titanium catalyst (6) gives different physical properties when used in the dual catalyst system of the present invention (19).

The Dow chromium modified titanium catalyst can also be used in the dual catalyst system of the present invention (see polymerizations 7 and 20).

The Phillips' (U.S. Pat. No. 3,622,521) titanium modified chromium catalyst can be used in the dual catalyst system of the present invention (see polymerizations 4 and 21).

The Chemplex (U.S. Pat. No. 4,041,224) titanium modified chromium catalyst can be used in the dual catalyst system of the present invention (see polymerizations 5 and 22).

We claim:

1. A catalyst mixture of at least two independently supported catalysts comprising (1) at least one inorganic halide supported Ziegler catalyst containing titanium, vanadium or mixture thereof and (2) at least one inorganic oxide supportedchromium containing catalyst.

2. The catalyst mixture of claim 1 wherein the inorganic halide supported catalyst and the inorganic oxide supported catalyst are present in quantities so as to provide a value of Xn in the equation $Xn = 1 - Xm$ of from about 0.001 to about 0.999 and wherein the Ziegler catalyst is supported on a magnesium dihalide support; wherein Xn is the fractional percent yield contributed by the inorganic halide supported catalyst and Xm is the fractional percent yield contributed by the inorganic oxide supported catalyst.

3. The catalyst mixture of claim 2 wherein the value for Xn is from about 0.01 to about 0.99.

4. The catalyst mixture of claim 3 wherein the value for Xn is from about 0.1 to about 0.9.

5. The catalyst mixture of claim 4 wherein the magnesium dihalide supported Ziegler catalyst contains titanium and one or more transition metal from Groups IVB, VB or VIB of the Periodic Table.

6. The catalyst mixture of claim 4 wherein the inorganic oxide supported catalyst contains chromium and one or more transition metals from Groups IVB, VB or VIB of the Periodic Table.

7. The catalyst mixture of claims 1, 2, 3, 4, 5 or 6 wherein (1) the inorganic halide supported Ziegler type catalyst is a magnesium chloride supported titanium tetraalkoxide catalyst reduced with an aluminum-containing compound wherein the atomic ratios of Mg:Ti is from about 0.1:1 to about 200:1; Al:Ti is from about 0.5:1 to about 200:1 and xsCl:Al is from about 0:1 to about 10:1 and (2) the inorganic oxide supported catalyst is supported on silica and contains chromium oxide wherein the atomic ratio of Si:Cr is from about 10:1 to about 1000:1.

8. The catalyst mixture of claim 7 wherein the atomic ratio of Mg:Ti is from about 1:1 to about 100:1; the atomic ratio Al:Ti is from about 1:1 to about 100:1 the atomic ratio of xsCl:Al is from about 0.05:1 to about 1:1 and the atomic ratio of Si:Cr is from about 20:1 to about 500:1.

9. The catalyst mixture of claim 8 wherein the atomic ratio of Mg:Ti is from about 10:1 to about 50:1; the atomic ratio Al:Ti is from about 5:1 to about 50:1 the atomic ratio of xsCl:Al is from about 0.1:1 to about 0.4:1 and the atomic ratio of Si:Cr is from about 50:1 to about 200:1.

* * * * *

UNITED STATES PATENT AND TRADEMARK OFFICE
CERTIFICATE OF CORRECTION

PATENT NO. : 4,285,834
DATED : August 25, 1981
INVENTOR(S) : Kirby Lowery, Jr. and Fred L. Vance, Jr.

It is certified that error appears in the above—identified patent and that said Letters Patent is hereby corrected as shown below:

Col. 1, line 54, correct the number "1,500,973" to --1,500,873--.

Col. 6, line 49, correct the formula "$I_{10}/I_{2L}$" to --$I_{10}/I_2$--.

Col. 7, line 6, correct "339-63" to --339=63--.

Col. 7, line 24, correct the word "simlar" to --similar--.

Col. 8, line 10, delete the word "of" before copolymer/g.

In the Table, 3rd line of the headings, add a comma --,-- between the words Productivity and Yields.

In the Table, 4th line of headings, correct "$T^8$" to --$T^6$--.

In the Table, first column, line 13, change "$13^{14}$" to --$13^{24}$--.

Page 2 of the Table, 3rd line, add a comma --,-- between the words Productivity and Yields.

Page 2 of the Table 4th line of headings, correct "$T^8$" to --$T^6$--.

Col. 15, line 51, correct the word "that" to --than--.

Col. 16, line 5 of Claim 1, correct "supportedchromium" to --supported chromium--.

Signed and Sealed this

Fifteenth Day of December 1981

[SEAL]

Attest:

Attesting Officer

GERALD J. MOSSINGHOFF
Commissioner of Patents and Trademarks